July 24, 1962  C. A. E. BEURTHERET  3,046,428
HIGH FREQUENCY ENERGY INTERCHANGE DEVICE
Filed June 5, 1959  3 Sheets-Sheet 1

CHARLES A.E. BEURTHERET
INVENTOR.

BY Urban H. Faubion

ATTORNEY

July 24, 1962  C. A. E. BEURTHERET  3,046,428
HIGH FREQUENCY ENERGY INTERCHANGE DEVICE
Filed June 5, 1959  3 Sheets-Sheet 2

CHARLES A.E. BEURTHERET
INVENTOR.

BY Urban H. Jaubion

ATTORNEY

CHARLES A.E. BEURTHERET
INVENTOR.

BY

ATTORNEY

United States Patent Office 3,046,428
Patented July 24, 1962

3,046,428
HIGH FREQUENCY ENERGY INTERCHANGE
DEVICE
Charles A. E. Beurtheret, Saint-Germain-en-Laye, France, assignor to Compagnie Francaise Thomson-Houston, Paris, France
Filed June 5, 1959, Ser. No. 818,332
Claims priority, application France June 6, 1958
7 Claims. (Cl. 313—12)

The present invention relates to vapor cooling apparatus for electric discharge devices and is particularly suited for cooling electrodes of high power, high frequency discharge devices of the transmitting type. The present invention constitutes a further development of and improvement on the vapor cooling apparatus described and claimed in my copending applications Serial No. 232,188, filed June 28, 1951, now Patent No. 2,935,305, dated May 3, 1960, and Serial No. 273,813, filed February 28, 1952, now Patent No. 2,935,306, dated May 3, 1960.

In the above-identified copending applications, the advantages of vapor cooling as compared with liquid cooling are pointed out and suitable radiator or anode cooling structures and associated evaporators or boilers are described and claimed. The present invention relates particularly to improved radiator or electrode cooling structures suitable for such systems.

In the first of my two copending applications mentioned above (Serial No. 232,188), the cooling structure involves the use of a plurality of outwardly extending tapered and relatively massive projections. The massive ends of the projections are adjacent to the electrode to be cooled and the projections taper away from the electrode. The heat exchange process, which involves boiling, is effective due to the fact that the cooling structure is immersed in a liquid which is not boiling so that there is a continuous temperature gradient between the massive or larger end of the projections (the hot end) and the tapered end (the cool end). The projections involved are each solid and the desired thermal exchange takes place by the boiling action of the liquid layer adjacent the projection and the continuous replacement of the vapor thus formed with liquid.

Systematic tests have shown that in spite of the small amount of heat that reaches the cooler ends of the projections, the effectiveness of the heat transfer that keeps this region at a temperature little higher than that of the liquid is of decisive importance in maintaining the continuity of the temperature gradient throughout the length of the projections and in maintaining the stability of the boiling at the base and sides of them.

The methods which have been recommended for improving the heat transfer at the cool ends of the projections include locally increasing the useful projection or heat transfer surface and also increasing the speed and turbulence of the liquid moving around the cool ends, at which the heat transfer ordinarily takes place without boiling.

A particularly good method of increasing the speed and turbulence of the liquid is described in the second of the two copending applications mentioned above, i.e., Serial No. 273,813. This method includes positioning a cylindrical sleeve near ends or surfaces of the projections. In this manner, a natural thermosiphon movement is obtained through the coaxial cylinder and around the cooling structure. This provides a marked improvement in the heat transfer from the surfaces of the tips of the projections. If the latter are of normal proportions, it will be noted that the best location for the cylindrical sleeve is at a few millimeters from the end surfaces of the projections.

Although the cooling means described above have provided a great improvement over other known cooling arrangements, it has been noticed that the large amount of vapor escaping from between the projections (the ducts) at high loads clogs the area around the ends of the projections with vapor and keeps them from being in contact with the liquid.

The present invention is directed to providing means for eliminating the vapor from the ducts from interfering with liquid flow around the ends of the projections.

A solution to the problem which immediately comes to mind consists of closing the projection ducts laterally. However, this arrangement turns out to be of no value because it reduces the effectiveness of the structure for cooling to below what it is when these ducts are left open along the sides. Thus, the advantage that might have been expected from heat transfer by metallic contact between the ends of the projections and the outer cylinder does not exist.

In carrying out the present invention, a cooling structure is provided which is intended to be used with, or as part of, an electrode, and the cooling structure employs outwardly extending and relatively massive projections of high thermal conductivity. The "cold spot" at the end of the projections is improved by providing closed cooling ducts in the body or at their contact surface through which thermosiphon circulation can occur independently of the motion of the vapor-charged emulsion that is passing through the gaps between the active surfaces of the projections.

The novel features which are believed to be characteristic of the invention are set forth in the appended claims. The invention itself, however, both as to its organization and method of operation, together with further objects and advantages thereof, may best be understood by reference to the following description taken in connection with the accompanying drawings in which:

Figure 1:
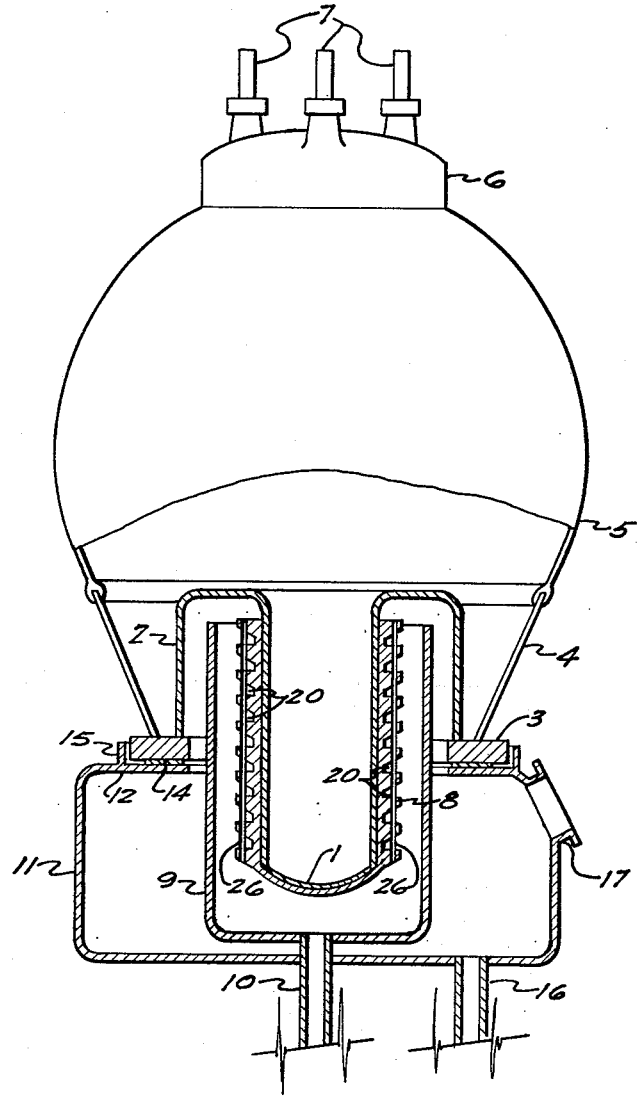
FIGURE 1 is an elevational view partly in section of an electric discharge device including a surrounding boiler and anode cooling structure employing the present invention.

Referring now to FIGURE 1 of the drawings, an electric discharge device is illustrated and described to show and intended environment for the cooling structure of the present invention. The electric discharge device illustrated is of the type which includes an anode 1 forming a part of the envelope. As illustrated, the anode is of the reentrant type, which renders the discharge device particularly suited for moderately high frequency operation. The anode also includes a cylindrical portion 2 of large diameter than the main portion of the anode 1 and which is formed as an integral part of the anode structure. This portion 2 is brazed to a heavy annular flange 3 which provides a support for the tube as a whole. The envelope of the discharge device is completed by a still larger circular collar 4 brazed to the flange 3 at its lower end and sealed at its upper end to a glass envelope 5. The upper end of the envelope is closed by a header 6 through which the conductors 7 for connection with the grid and cathode are sealed.

It will be appreciated that the anode is provided with outwardly extending tapered and relatively massive projections 8 to provide an effective anode radiator. The structure of the projections 8 conforms with the teachings of the copending application Serial No. 232,188 previously referred to and also employs the improvements of the present invention.

The configuration of the projections is described in detail and the advantages thereof are set for explicitly below. However, those skilled in the art will appreciate from the drawings that the projections are in good heat transfer relation with the anode cylinder 1 and are formed integrally therewith or bonded thereto by a layer of solder.

The specific boiler or evaporator structure illustrated is described and claimed in the copending application Serial No. 273,813 referred to above. An abbreviated description is repeated here to provide complete understanding of the invention. The structure includes an inner cylindrical casing 9 which surrounds the anode cylinder 1 and is spaced from both the anode cylinder 1 and the surrounding portion of the anode 2 and terminates short of the connecting part of the anode between parts 1 and 2. This casing 9 is preferably spaced a distance of not more than a few millimeters from the outer periphery of projections 8 if the best results are to obtained. The casing 9 is provided at its lower end with an inlet conduit 10. The boiler is completed by an outer surrounding casing 11 provided at its upper end with an opening of about the diameter of the inner edge of the annular flange 3 and defined by an inwardly directed flange 12 on which the annular ring 3 rests. The discharge device may be sealed to the radiator at this point by means of an interposed gasket 14 and also may be clamped in position, if desired, by suitable means (not shown). An upstanding flange 15 may also be provided around the annular ring 3 to center the tube in the evaporator. The casing 11 is provided with an outlet conduit 16 in the bottom thereof and with an upwardly directed conduit 17 extending from near the top of the side wall thereof. The conduit 17 provides a passage from which vapor generated by the cooling operation may be removed.

In the operation, cooling liquid such as water is supplied to the conduit 10 and to the inner casing 11 in sufficient quantity to at least maintain this receptacle full. The rate of supply of the liquid is much less than that required to prevent the formation of steam and in some installations it may be just sufficient to replace the liquid vaporized. In other installations, it may be desirable to supply a substantial amount of cooling liquid from the outlet conduit 16 in the outer casing 11. In such systems, the flow of water may be adjusted to about 1/10 of that required for normal liquid cooling without any formation of vapor. This will normally be in the order of ten times the amount of water required merely to replenish the liquid vaporized.

It is an important aspect of the present invention that the protuberances or projections 8 are designed to assist in the movement of any steam that is formed upwardly in the casing 9 and prevent formation of vapor pockets on the hot surface of the anode 1 or the vapor from escaping from between the fins or projections 8 and clogging the relatively small area between the ends of the projections 8 and the cylindrical jacket 9. As shown in FIGURE 1, the fins 8 are of relatively heavy cross section at the base or surface of the anode and taper outwardly. These fins 8 define a series of open channels along the length of the anode 1. Further, the movement of the steam bubbles upwardly may be still further facilitated by machining a plurality of slots 20 circumferentially around the projection 8 to form a plurality of upwardly sloping surfaces. It is to be particularly understood, however, that anodes employing the invention need not use such slots. Therefore, the anode cooling means illustrated in FIGURES 2 through 8 may or may not employ such slots.

Figure 2:
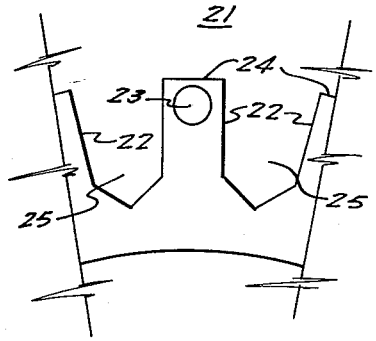
FIGURES 2, 3, 4, 5 and 6 are plan views of segments of cooling structures of various configurations which illustrate the present invention.
Figure 3:
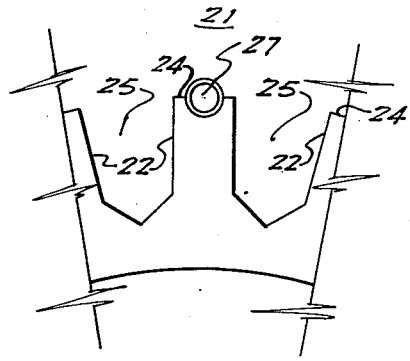

FIGURE 2 shows a plan view of part of an anode cooling means 21 which may be used with the device of FIGURE 1. The anode cooling means is provided with vertical solid ribs 22 which define a series of open channels 25 along the length of the anode. The ribs 22 are of a relatively heavy cross section at the base or surface of the anode and taper outwardly to the main rib section or end 24 which is illustrated as having parallel vertical sides. In accordance with an important aspect of the invention, a hole or aperture 23 is provided in the immediate vicinity of the end 24 of the radial projections 22 in the form of a circular duct (also 23), obtained for example by punching.

It is seen that if such a structure is immersed in a liquid to cool it, two independent thermosiphon movements occur. One such movement occurs in the vertical chimneys or channels 25 defined by the vertical grooves between solid vertical ribs 22, with vigorous vaporization at the bottom and sides of the projections 22, and the other movement occurs in the ducts 23, which clearly are less blocked by vapor bubbles as the power developed in this duct is much less than that which causes boiling in the channels 25.

If the ribs 22 have the annular grooves therearound as illustrated by the grooves 20 in FIGURE 1, the ducts 23 may be formed simply by the apertures in the ends 24, or a tubular conduit may be inserted in the apertures 23 in such a manner that it extends through all such apertures which are in vertical alignment. Such an arrangement is illustrated by the vertical ducts 26 in FIGURE 1.

Figure 4:
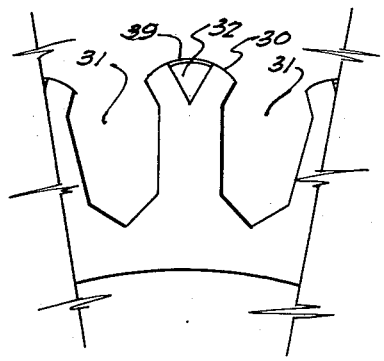
Figure 5:
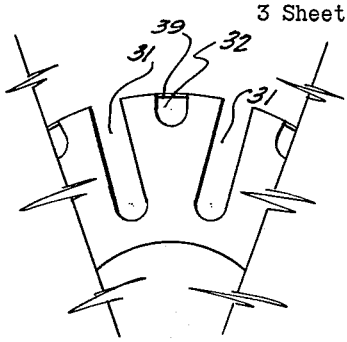
Figure 6:
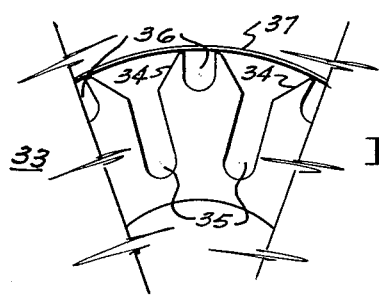

FIGURES 4 and 5 show anode cooling means with vertical ribs 30 of different constructions which define vertical chimneys or channels therebetween. In each structure, however, a duct 32 is formed for a second independent thermosiphon movement in a similar way. That is, grooves are milled in the vertical ribs 30 and these grooves are simply closed by an applied metal strip 39.

All of these arrangements are compatible with the use of a coaxial cylinder or sleeve that is intended to guide the thermosiphon motion in the channels between vertical ribs as described with respect to the chimney 9 of FIGURE 1.

For some arrangements and applications, where a chimney such as the cylindrical casing 9 is used in conjunction with the anode cooling means, the independent thermosiphon movement may be provided without providing a tightly closed duct. For example, in FIGURE 6, such an arrangement is shown. In this embodiment, an anode cooling structure 33 is provided with vertical ribs 34 which define vertical channels 35 therebetween for one thermosiphon movement. Grooves 36 are milled in the outer ends of ribs 34 to define ducts for the second thermosiphon movement. The ducts are not closed tightly at the sides but are formed by the milled slots or grooves 36 and a coaxial cylinder 37 which very nearly contacts the ends of the ribs 34. The dimensions of the main chimney must be such that the location of cylinder 37 in this position is compatible with correct thermosiphon operation.

Figure 7:
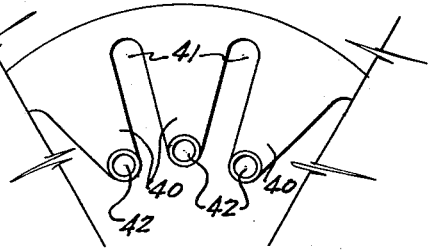
FIGURES 7 and 8 are plan views of segments of cooling structures embodying the present invention which are adapted for use with electrodes which must be cooled internally.
Figure 8:
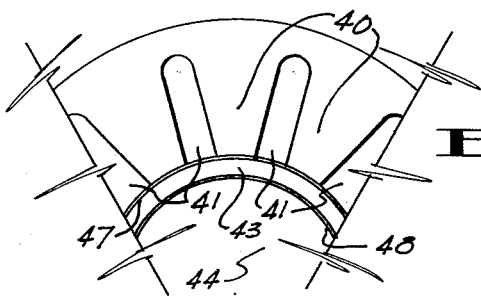

FIGURES 7 and 8 show the special case of an "internal anode." The internal anodes also use coaxial cylinders or sleeves which guide the thermosiphon motion up by the vertical ribs. However, in the case of the internal anode the fluid guiding sleeve is internal. In FIGURE 7, the ends of vertical ribs 40 that are separated by channels 41 are in contact with individual ducts 42. The ducts 42 are defined by a pipe or conduit which extends along the length of the ribs 40. In FIGURE 8, the duct 43 is a single duct, as a limiting case, which duct is in contact with the ends of all of the ribs 40. The duct 43 is defined by a pair of coaxially positioned cylindrical members 47 and 48 coaxially positioned inside the anode. The diameter of the outer coaxial cylinder 47 is such as to contact the ends of the ribs 40. The hollow inner cylinder 48 provides a coaxial duct 44 for the thermosiphon return.

While particular embodiments of this invention have been illustrated and described, it will, of course, be understood that the invention is not limited thereto since many modifications both in the arrangements and in the instrumentalities employed, may be made. It is contemplated that the appended claims will cover any such modifications as fall within the true spirit and scope of this invention.

What I claim is new and desire to secure by Letters Patent of the United States is:

1. In a high frequency energy interchange device having electrodes at least partially immersed in a cooling liquid including cooling means associated with an electrode of the device for cooling said electrode by vaporization of a cooling liquid, said cooling means including a generally cylindrical electrode cooling member having a plurality of longitudinal circumferentially spaced solid rib members defining separate end portions and channels therebetween, a generally cylindrical fluid directing sleeve member positioned concentrically and substantially coextensively with respect to said electrode cooling member, said fluid directing sleeve member having such a diameter that a space is provided between the end portions of said solid rib members and said sleeve member whereby said channels and the space around said end portions support a first thermosiphon movement of cooling liquid past said rib members, and duct means extending along the said end portions in thermal contact therewith supporting substantially independent second thermosiphon movement of cooling liquid past the said end portions of said rib members.

2. In combination in a high frequency energy interchange device having electrodes at least partially immersed in a cooling liquid including a cooling means for an electrode of the device which performs the cooling operation by vaporization of a cooling liquid, said cooling means including a generally cylindrical electrode cooling member having a plurality of circumferentially spaced rib members protruding outwardly therefrom to define individual end portions and depressed channels therebetween, a generally cylindrical fluid directing sleeve member positioned concentrically and substantially coextensively with respect to said electrode cooling member, said fluid directing sleeve member having such a diameter that a space is provided between the end portions of said solid rib members and said sleeve member whereby said channels and the space around said end portions support a first thermosiphon movement of cooling liquid along the length of and between said rib members, and individual duct means defined by apertures extending the length of said individual end portions of individual rib members thereby supporting substantially independent second thermosiphon movement of cooling liquid along the length of each individual end portion.

3. In combination in a high frequency energy interchange device having electrodes at least partially immersed in a cooling liquid including a cooling means for an electrode of the device which performs the cooling operation by vaporization of a cooling liquid, said cooling means including a generally cylindrical electrode cooling member having a plurality of circumferentially spaced rib members protruding outwardly therefrom to define individual end portions and depressed channels therebetween, a generally cylindrical fluid directing sleeve member positioned concentrically and substantially coextensively with respect to said electrode cooling member, said fluid directing sleeve member having such a diameter that a space is provided between the end portions of said solid rib members and said sleeve member whereby said channels and the space around said end portions support a first thermosiphon movement of cooling liquid along the length of and between said rib members, and individual duct means defined by hollow conduit extending the length of said individual end portions of said individual rib members and in intimate thermal contact therewith whereby said conduit supports independent second thermosiphon movement of cooling liquid along the length of individual end portions.

4. The combination in a high frequency energy interchange device having electrodes at least partially immersed in a cooling liquid including a cooling means for an electrode of the device which performs the cooling operation by vaporization of the cooling liquid, said cooling means including a generally cylindrical electrode cooling member having a plurality of circumferentially spaced rib members protruding outwardly therefrom to define individual end portions and depressed channels therebetween, a generally cylindrical fluid directing sleeve member positioned concentrically and substantially coextensively with respect to said electrode cooling member, said fluid directing sleeve member having such a diameter that a space is provided between the end portions of said solid rib members and said sleeve members whereby said channels and the space around said end portions support a first thermosiphon movement of cooling liquid along the length of and between said rib members, and individual duct means defined by providing individual grooves which extend the length of each said individual end portion of said rib members and a mating strip positioned to substantially close the groove whereby said ducts support an independent second thermosiphon movement of cooling liquid along the length of said individual end portions.

5. In combination in a high frequency energy interchange device having an electrode to be cooled internally at least partially immersed in a cooling liquid including a cooling means for the said electrode which performs the cooling operation by vaporization of the cooling liquid, said cooling means including a generally cylindrical electrode cooling member having a plurality of circumferentially spaced rib members extending inwardly therefrom to define individual end portions and depressed channels therebetween, a generally cylindrical fluid directing sleeve member positioned concentrically within said cooling member said sleeve extending substantially the length of said rib members and having a diameter such that a space is provided between the end portions of said rib members and said sleeve member whereby said channels and the space around said end portions support a first thermosiphon movement of cooling liquid along the length of and between said rib members, and individual duct means defined my apertures extending the length of said individual end portions of individual rib members thereby supporting substantially independent second thermosiphon movement of cooling liquid along the length of each individual end portion.

6. In combination in a high frequency energy interchange device having an electrode to be cooled internally at least partially immersed in a cooling liquid including a cooling means for the said electrode which performs the cooling operation by vaporization of the cooling liquid, said cooling means including a generally cylindrical electrode cooling member having a plurality of circumferentially spaced rib members extending inwardly therefrom to define individual end portions and depressed channels therebetween, a generally cylindrical fluid directing sleeve member positioned concentrically within said cooling member said sleeve extending substantially the length of said rib members and having a diameter such that a space is provided between the end portions of said rib members and said sleeve member whereby said channels and the space around said end portions support a first thermosiphon movement of cooling liquid along the length of and between said rib members, and individual duct means defined by hollow conduit extending the length of said individual end portions of individual rib members and in intimate thermal contact therewith whereby said conduit supports independent second thermosiphon movement of cooling liquid along the length of individual end portions.

7. In combination in a high frequency energy interchange device having an electrode to be cooled internally at least partially immersed in a cooling liquid including a cooling means for the said electrode which performs the cooling operation by vaporization of a cooling liquid, said cooling means including a generally cylindrical electrode cooling member having a plurality of circumferentially spaced rib members extending inwardly therefrom to define individual end portions and depressed channels therebetween, a generally cylindrical fluid directing sleeve member positioned concentrically within said cooling member said sleeve extending substantially the length of said rib members and having a diameter such that a space is provided between the end portions of said rib members and said sleeve member whereby said channels and the space around said end portions support a first thermosiphon movement of cooling liquid along the length of and between said rib members, and duct means adjacent said end portions of said rib members for supporting a second substantially independent thermosiphon movement of said cooling liquid past said end portions, said duct means defined by a pair of hollow concentric cylinders of thermally conducting material positioned inside said electrode structure, the outer one of said pair of cylinders having an external diameter substantially equal to the internal diameter of the said end portions of said rib members.

References Cited in the file of this patent

UNITED STATES PATENTS

| | | |
|---|---|---|
| 2,362,911 | Litton | Nov. 14, 1944 |
| 2,440,245 | Chevigny | Apr. 27, 1948 |
| 2,745,895 | Lideen | May 15, 1956 |
| 2,873,954 | Protze | Feb. 17, 1959 |